United States Patent
Doyoyo et al.

(10) Patent No.: US 8,057,594 B2
(45) Date of Patent: Nov. 15, 2011

(54) HIGH STRENGTH POZZOLAN FOAM MATERIALS AND METHODS OF MAKING THE SAME

(75) Inventors: Mulalo Doyoyo, Marietta, GA (US); Paul Biju-Duval, Boulogne-billancourt (FR)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 12/665,578

(22) PCT Filed: Jun. 19, 2008

(86) PCT No.: PCT/US2008/067532
§ 371 (c)(1),
(2), (4) Date: Dec. 3, 2010

(87) PCT Pub. No.: WO2008/157714
PCT Pub. Date: Dec. 24, 2008

(65) Prior Publication Data
US 2011/0146538 A1    Jun. 23, 2011

Related U.S. Application Data

(60) Provisional application No. 60/944,809, filed on Jun. 19, 2007.

(51) Int. Cl.
*C04B 38/00* (2006.01)
*C04B 7/12* (2006.01)
*C04B 18/00* (2006.01)
*C04B 18/06* (2006.01)
*C04B 24/40* (2006.01)
*C04B 111/40* (2006.01)

(52) U.S. Cl. ........ 106/679; 106/677; 106/681; 106/705; 106/708; 106/790; 106/811

(58) Field of Classification Search .................. 106/672, 106/679, 705, 708, 677, 681, 790, 811
See application file for complete search history.

(56) References Cited

U.S. PATENT DOCUMENTS

| 4,243,575 | A |   | 1/1981  | Myers et al.                   |
|-----------|---|---|---------|--------------------------------|
| 4,328,034 | A | * | 5/1982  | Ferguson ............... 106/601 |
| 4,640,715 | A | * | 2/1987  | Heitzmann et al. ....... 106/706 |
| 4,642,137 | A | * | 2/1987  | Heitzmann et al. ....... 106/607 |
| 5,352,288 | A | * | 10/1994 | Mallow .................... 106/605 |
| 5,601,643 | A | * | 2/1997  | Silverstrim et al. ....... 106/624 |
| 5,820,668 | A | * | 10/1998 | Comrie .................... 106/600 |
| 6,416,572 | B1| * | 7/2002  | Eldemallawy et al. .... 106/38.27 |
| 2002/0055559 | A1 |  | 5/2002 | Kistenmacher et al.           |
| 2004/0019141 | A1 |  | 1/2004 | Bastelberger et al.           |
| 2005/0167106 | A1 |  | 8/2005 | Reddy et al.                   |
| 2005/0284634 | A1 |  | 12/2005| Chatterji et al.               |
| 2006/0254468 | A1 |  | 11/2006| Bastelberger et al.           |

FOREIGN PATENT DOCUMENTS

| JP | 08290982 A  |   | 11/1996 |
|----|-------------|---|---------|
| SU | 492532 A    | * | 1/1974  |
| SU | 589231 A    | * | 1/1978  |
| SU | 655473 A    | * | 4/1979  |
| WO | 0230846 A1  |   | 4/2002  |

OTHER PUBLICATIONS

Derwent-Acc-No. 2005-301830, abstract of KR2004105122A (Jun. 2003).*
Supplementary Partial Search Report for related Application No. EP 08771501.7 dated Apr. 21, 2011.
International Search Report for related PCT Application No. PCT/US2008/067532 dated Sep. 22, 2008.
Minarikova, Martina et al., "Fixation of Heavy Metals in Geopolymeric Materials Based on Brown Coal Fly Ash", Ceramics, vol. 50, No. 4, pp. 200-207, 2006.
Naidenov, M.N. et al., "Raw Material Mixture for Manufacturing Foam Silicate Articles", Chemical Abstracts, vol. 88, No. 16, p. 1, Apr. 17, 1978.

* cited by examiner

*Primary Examiner* — Anthony Green
(74) *Attorney, Agent, or Firm* — Ryan A. Schneider, Esq.; Jihan A. R. Jenkins, Esq.; Troutman Sanders LLP

(57) ABSTRACT

The various embodiments of the present invention relate generally to high strength foam materials and methods of making the same. More particularly, various embodiments of the present invention relate to high strength foam materials comprising pozzolans, such as cenospheres derived from fly ash. An embodiment of the present invention comprises, a pozzolan foam material comprising a pozzolan, an alkali, a silicate, and an organosilicon compound. Various embodiments of the present invention are directed to strong, lightweight materials that are environmentally-friendly and can be economically manufactured.

18 Claims, 8 Drawing Sheets

HIGH STRENGTH POZZOLAN FOAM MATERIALS AND METHODS OF MAKING THE SAME

RELATED APPLICATIONS

This application, filed under 35 U.S.C. §371, is a U.S. National Stage Application of International Patent Application Serial Number PCT/US2008/067532, filed 19 Jun. 2008, entitled "High Strength Pozzolan Foam Materials and Methods of Making the Same, which claims, under 35 U.S.C. §119(e), the benefit of U.S. Provisional Application Ser. No. 60/944,809, filed 19 Jun. 2007, the entire contents and substance of which are hereby incorporated by reference as if fully set forth below.

TECHNICAL FIELD

The various embodiments of the present invention relate generally to high strength foam materials and methods of making the same. More particularly, various embodiments of the present invention relate to high strength foam materials comprising pozzolans and an organosilicon compound.

BACKGROUND OF THE INVENTION

Enormous amounts of ash are produced in the generation of electricity using black coal-fired burners. Fly ash is generally captured from the chimneys of power generation facilities, whereas bottom ash, as the name suggests, is removed from the bottom of the furnace. In the past, fly ash was generally released into the atmosphere, but pollution control equipment permits the capture of fly ash, preventing its entrance into the atmosphere and reducing its pollutive effects.

One component of fly ash is cenospheres, which are spherical inorganic hollow microparticles comprising the lightest component of fly ash. Cenospheres typically comprise approximately 1%-2% of fly ash and can be recovered or "harvested" from fly ash.

Given the large amounts of fly ash that are generated, the continued retention and storage of fly ash is problematic. In an attempt to address the accumulation of fly ash, several processing methods exist to utilize or dispose of fly ash in a satisfactory manner. Methods along these lines involve the formation of aggregates and other materials, whereby a polymeric binder or a cement is mixed with the fly ash. However, these methods suffer from several disadvantages, including but not limited to, that relatively small proportions of fly ash can be used, substantial heating is required, or the cost of the binders/cement results in an expensive product.

The recycling of fly ash has become an increasing concern in recent years due to increasing landfill costs and current interest in sustainable development. In 2005, U.S. coal-fired power plants reported producing 71.1 million tons of fly ash, of which 29.1 million tons was reused in various applications. If the nearly 42 million tons of unused fly ash had been recycled, it would have reduced the need for approximately 33,900,000 m³ of landfill space. In addition, recycling fly ash provides other environmental benefits, such as reducing the demand for virgin materials that would need quarrying and substituting for materials that may be energy-intensive to create (e.g., Portland cement).

There is currently a great demand for strong and lightweight materials that are easily and economically manufactured. Such materials have long been sought by the construction and automotive industries to increase the strength, durability, and resilience of structures while reducing the weight of the structure. In the context of the construction industry, such materials can make buildings more resistant to natural disasters (e.g., earthquakes), whereas strong, lightweight materials can reduce the energy consumption of an automobile. In addition, there is a demand for porous materials as they can act as sound or thermal insulators and as shock absorbers. However, presently available materials that meet these criteria, such as metallic foams, are very expensive. Furthermore, there is a great demand for environmentally-friendly "green" materials.

Accordingly, there is a need for strong and lightweight materials that are environmentally-friendly and can be manufactured economically. It is to the provision of such materials that the various embodiments of the present invention are directed.

SUMMARY

Various embodiments of the present invention are directed to high strength pozzolan foam materials and methods of making the same. More particularly, various embodiments of the present invention comprise a pozzolan foam material comprising a pozzolan and an organosilicon compound. In an embodiment of the present invention, a pozzolan foam material can further comprise an alkali and a silicate. The pozzolan can comprise an aluminosilicous material. In an embodiment of the present invention, an aluminosilicous material can comprise a plurality of cenospheres. The pozzolan of the pozzolan foam material can comprise about 50% to about 90% of the foam material. In an embodiment of the present invention, the pozzolan foam material can comprise a foam-induced porosity of about 0% to about 30%.

In an embodiment of the present invention, the alkali can comprise a basic, ionic salt of an alkali metal. In another embodiment of the present invention, the alkali can comprise a basic, ionic salt of an alkaline earth metal element. More particularly, the alkali can comprise one or more of sodium hydroxide, calcium hydroxide, potassium hydroxide, and magnesium hydroxide. In an embodiment of the present invention, the silicate can comprise an alkali metal silicate. More particularly, the alkali metal silicate can comprise sodium silicate. In an embodiment of the present invention, the organosilicon compound can comprise dimethylsiloxane.

A pozzolan foam material can further comprise a hydrophobic compound. In an embodiment of the present invention, the hydrophobic compound can comprise a cooking oil. In another embodiment of the present invention, the hydrophobic compound can comprise an alkane.

A pozzolan foam material can further comprise a phosphorous containing compound. In an embodiment of the present invention, the phosphorous containing compound can comprise aluminum phosphate. In another embodiment of the present invention, the phosphorous containing compound can comprise phosphoric acid.

A pozzolan foam material can further comprise one or more of gravel, sand, soil, stone, pigment, calcined soil, Portland cement, limestone, gypsum, concrete, mortar, and grout.

An aspect of the present invention comprises a pozzolan foam material comprising a plurality of cenospheres, sodium hydroxide, sodium silicate, and dimethylsiloxane. In an embodiment of the present invention, the plurality of cenospheres can have an average longest dimension of less than about 5 micrometers to about 500 micrometers. In an embodiment of the present invention, the plurality of cenospheres can comprise about 50% to about 90% of the foam material. The concentration of sodium hydroxide in a pozzolan foam material is about 1 M to about 2.5 M. The concentration of sodium silicate in a pozzolan foam material is about 1% to about 9% of the foam material. The concentration of dimethylsiloxane in a pozzolan foam material is less than about 8 mg/ml. A pozzolan foam material can comprise a foam-induced porosity of about 0% to about 30%. The pozzolan foam material can comprise a compressive strength of greater than about 3 MPa.

An aspect of the present invention comprises a method of making a pozzolan foam material comprising: admixing a pozzolan, an alkali, a silicate, and an organosilicon compound to form a mixture; and curing the mixture to form a pozzolan foam material. In an embodiment of a method of making a pozzolan foam material, the pozzolan can comprise an aluminosilicous material. The aluminosilicous material can comprise a plurality of cenospheres.

In an embodiment of a method of making a pozzolan foam material, the alkali can comprise a basic, ionic salt of an alkali metal. In another embodiment of a method of making a pozzolan foam material, the alkali can comprise a basic, ionic salt of an alkaline earth metal element. More particularly, the alkali can comprise one or more of sodium hydroxide, calcium hydroxide, potassium hydroxide, and magnesium hydroxide. In an embodiment of the present invention, the silicate can comprise an alkali metal silicate. More particularly, the alkali metal silicate can comprise sodium silicate. In an embodiment of the present invention, the organosilicon compound can comprise dimethylsiloxane.

In an embodiment of a method of making a pozzolan foam material, the curing of a mixture to form a pozzolan foam material can comprise heating the mixture to temperatures of about 90° C. to about 130° C. for about 15 hours to about 28 hours. More particularly, curing the mixture to form a pozzolan foam material can comprise heating the mixture to temperatures of about 100° C. for about 20 hours.

In an embodiment of the present invention, a method of making a pozzolan foam material can further comprise prior to step curing the mixture to form a pozzolan foam material, forming the mixture into an article, wherein the step of curing the mixture to form a pozzolan foam material comprises curing the article to form an article comprising a pozzolan foam material. In an embodiment of the present invention, the article can comprise a building element.

In an embodiment of a method of making a pozzolan foam material, admixing a pozzolan, an alkali, a silicate, and an organosilicon compound to form a mixture can further comprise admixing a hydrophobic compound. In an embodiment of the present invention, the hydrophobic compound can comprise a cooking oil. In another embodiment of the present invention, the hydrophobic compound can comprise an alkane.

In an embodiment of a method of making a pozzolan foam material, admixing a pozzolan, an alkali, a silicate, and an organosilicon compound to form a mixture can further comprise admixing a phosphorous containing compound. In an embodiment of the present invention, the phosphorous containing compound can comprise aluminum phosphate. In another embodiment of the present invention, the phosphorous containing compound can comprise phosphoric acid.

In an embodiment of a method of making a pozzolan foam material, admixing a pozzolan, an alkali, a silicate, and an organosilicon compound to form a mixture can further comprise admixing one or more of gravel, sand, soil, stone, pigment, calcined soil, Portland cement, limestone, gypsum, concrete, mortar, grout.

An aspect of the present invention comprises an apparatus for containing a medium comprising: a container having a medium containing volume, wherein the medium containing volume has a first surface and a second surface; a medium contained within the medium containing volume; and a reinforcing structure comprising a plurality of elements that traverse the containing volume and are associated with the first surface and second surface of the containing volume; a plurality of struts that interconnect the plurality of elements at a first node; a plurality of struts that interconnect a plurality of struts at a second node; and a plurality of struts that connect the plurality of elements to the first surface or second surface at a third node. In an embodiment of the present invention, the reinforcing structure can comprise a pozzolan foam material. The medium can comprise a solid, a fluid, a liquid, a solution, a suspension, a gas, a gel, a dispersion, or combination thereof. More particularly, the medium can comprise hydrogen.

An aspect of the present invention can comprise an apparatus for containing a medium comprising: a container comprising a medium containing volume, the medium containing volume defined by an inner surface of the container; a medium contained within the medium containing volume; and a reinforcing structure comprising at least one layer of a pozzolan foam material disposed generally between the medium containing volume and the inner surface of the container, wherein the at least one layer of a pozzolan foam material is in fluid communication with the medium containing volume. The medium can comprise a solid, a fluid, a liquid, a solution, a suspension, a gas, a gel, a dispersion, or combination thereof. More particularly, the medium can comprise hydrogen.

In an embodiment of the present invention, the at least one layer of a pozzolan foam material can comprise a plurality of layers of a pozzolan foam material. In an embodiment of the present invention, the plurality of layers of a pozzolan foam material can comprise a plurality of concentric layers of a pozzolan foam material having the same porosity. In an embodiment of the present invention, the plurality of layers of a pozzolan foam material can comprise a plurality of concentric layers of a pozzolan foam material, at least one layer having a different porosity. In an embodiment of the present invention, the plurality of layers of a pozzolan foam material can comprise a plurality of concentric layers of a pozzolan foam material, wherein the concentric layers of a pozzolan foam material have decreasing porosities moving outward from the containing volume to inner surface of the container. In an embodiment of the present invention, the plurality of concentric layers of a pozzolan foam material can be separated by a divider. In an embodiment of the present invention, the divider can comprise a fire-resistant material.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF DRAWINGS

FIGS. 1 A-D illustrate at varying magnifications the physical appearance of a pozzolan foam material according to an exemplary embodiment of the present invention.

FIGS. 3 A-B are a schematic of a container for containing a medium comprising a tank and a plurality of concentric layers of a pozzolan foam material.

FIGS. 5 A-B provides stiffness measurements for a typical response of a pozzolan material comprising cenospheres of grade 500 (CG500).

FIGS. 6 A-B illustrate the energy absorption measurements for a typical response of a pozzolan material comprising cenospheres of grade 500 (CG500).

FIG. 9 A shows the typical effect of curing time for a pozzolan foam material comprising cenospheres of grade 500 (CG500) in compression.

FIG. 9 B shows the typical effect of curing time for a pozzolan foam material comprising cenospheres of grade 500 (CG500), using examples of CG500-03 and CG500-02 in tension.

DETAILED DESCRIPTION

An aspect of the present invention comprises a pozzolan foam material comprising a pozzolan and an organosilicon compound. As used herein, a "pozzolan" is a material that when reacted with an alkali exhibits increased material strengths due to the formation of bonds throughout the pozzolan material. For example, reaction of a pozzolan with an alkali can result in cementitious properties. A pozzolan can comprise a siliceous material, which is composed of silicon and oxygen, a aluminosilicous material, which is composed of aluminium, silicon, and oxygen, and combinations thereof. A pozzolan can comprise fly ash, cenospheres, silica fume, metakaolin, pozzolana, volcanic ash, blast furnace slag, calcined shale, trass, pumice, slag, diatomaceous earth, silicous clays, metropolitan waste ash, sewerage ash, other flue ashes, coal wash tailings, mineral tailings, scoria, obsidian, other pozzolanic materials, and neutral to slightly acidic slags, and combinations thereof, among others. The term "fly ash" as used herein is intended to indicate the finely divided ash residue produced by the combustion of pulverized coal, wherein ash is carried off with the gases exhausted from the furnace and is collected from these gases. In addition to the finely pulverized ashes resulting from the combustion of coal, finely pulverized ashes from the combustion of waste materials in large incinerators can also be utilized in the compositions disclosed herein providing their chemical compositions are reasonably similar to pulverized coal fly ashes.

Pozzolans are commonly used as an additive to Portland cement concrete mixtures to increase the long-term strength and other material properties of Portland cement concrete. Pozzolans are vitreous materials, which for example can react with calcium hydroxide to form calcium silicates; however, other cementitious materials can also be formed depending on the chemical composition of the pozzolan and alkali. The extent of the strength development of a material depends upon the chemical composition of the pozzolan. For example, a large composition of alumina and silica in the pozzolan material will result in a robust pozzolanic reaction and an increased strength display.

In an embodiment of the present invention, a pozzolan can comprise a plurality of cenospheres. The term "plurality" is used herein for convenience and refers to more than one. Cenospheres obtained from fly ash are a relatively inexpensive material of high quality obtained as a by-product in coal combustion at power plants. Cenospheres are characterized by spherical design, chemical and thermal stability, and high hydrostatic compressive strength of about 20-30 MPa at 50% destruction, and 10 MPa at 12% destruction. Cenospheres are lightweight pozzolan spheres of very low reactivity. The composition of their shells includes predominantly $SiO_2$ and $Al_2O_3$ and a minor content of $Fe_2O_3$, MgO, CaO, $Na_3O$, $K_2O$, and $TiO_2$. Their chemical composition makes them very resistant to acids and alkalis. They are neutral in pH and generally do not interfere in the chemistry or reaction of the products they are used in.

In an embodiment of the present invention, cenospheres have a spherical shape. Although the term "sphere" is used throughout the specification, it will be appreciated that this term is intended to include substantially spherical structures, including but not limited to, structures that are not true geometric spheres or structures that result from crushed or ground spheres. Considering that cenospheres have a generally spherical shape, production of a material that incorporates cenospheres would require less binder (e.g., resin, binder, among others) to wet out the surface of cenospheres than other shaped fillers. This results in low resin or binder demand, which in turn allows for high solids formulations, lower shrinkage, and often lower cost. Spherical fillers also exhibit excellent flow and are easily manipulated (e.g., spray, pump, trowel, among others). Therefore, cenospheres can be used to improve workability and ease of use in a wide variety of applications.

In an embodiment of the present invention, the cenospheres can comprises about 55% to about 65% $SiO_2$, about 27% to about 33% $Al_2O_3$, and less than about 6% $Fe_2O_3$. In an embodiment of the present invention, cenospheres have an average longest dimension of about 5 µm to about 500 µm. In an embodiment of the present invention, cenospheres can have an average longest dimension of about 5 µm to about 355 µm. In an embodiment of the present invention, cenospheres can have an average longest dimension of about 5 µm to about 300 µm. In an embodiment of the present invention, cenospheres can have an average longest dimension of about 5 µm to about 180 µm. In an embodiment of the present invention, cenospheres can have an average longest dimension of about 5 µm to about 106 µm. Cenospheres of the present invention can be obtained from many commercial sources, including but limited not to, Trelleborg Fillite, Ltd. However, one of skill in the art would realize that the chemical composition and size of the cenospheres can vary depending upon the desired application.

In an embodiment of the present invention, a pozzolan foam material can comprise about 50% to about 90% pozzolan. In another embodiment of the present invention, a pozzolan foam material can comprise about 60% to about 70% pozzolan. In yet another embodiment of the present invention, a pozzolan foam material can comprise about 64% to about 68% pozzolan. An amount of up to about 95% of the pozzolan material may be included in the mixture thereby providing for the possibility of both disposing of and utilizing substantial amounts of fly ash.

A pozzolan foam material can comprise an organosilicon compound. Organosilicon compounds are organic compounds containing a carbon-silicon bond (C—Si), including but not limited to, organosilanes, siloxides, silyl halides, silyl hydrides, silenes, and siloles.

In an exemplary embodiment of the present invention, an organosilicon compound can comprise a siloxane. Siloxane can comprise many chemical compounds composed of units of the form $R_2SiO$, where R is a hydrogen atom or a hydrocarbon group. A siloxane can have a branched or unbranched backbone of alternating silicon and oxygen atoms —Si—O—Si—O— with side chains R attached to the silicon atoms.

Siloxanes can comprise polymerized siloxanes with organic side chains, generally referred to as silicones or polysiloxanes. Siloxanes can comproises dimethylsiloxane (SiO $(CH_3)_2$), polydimethlysioxane ($[SiO(CH_3)_2]_n$), diphenylsiloxane (SiO$(C_6H_5)_2$), and polydiphenylsiloxane ($[SiO(C_6H_5)_2]_n$, among others. In an exemplary embodiment of the present invention, a siloxane is dimethylsiloxane.

Though not wishing to be bound by any particular theory, siloxane is believed to confer hydrophobic properties (e.g., water repellance) to a pozzolan foam material. In addition, siloxane functions as the foaming agent for a pozzolan foam material. A person of ordinary skill in the art would realize that the relationship between the amount of siloxane in a pozzolan foam material and the pororsity of the foam material is proportional. Thus, as the amount of siloxane in a pozzolan foam material increases, the porosity of the foam increases. In an embodiment of the present invention, a pozzolan foam material can comprise less than about 2 mg/ml to less than about 8 mg/ml dimethylsiloxane.

A pozzolan foam material can have a foaming-induced porosity ranging from about 0% to about 30%. In an exemplary embodiment of the present invention, a pozzolan foam material can have a foaming-induced porosity of about 8%. As used herein, the term "porosity" as it relates to a pozzolan foam material refers to the foaming-induced porosity of the material. The term "foaming-induced porosity" refers to the voids created by the foaming agent (e.g., organosilicon compound), which excludes the intrinsic porosity of the cenospheres.

In an embodiment of the present invention, a pozzolan foam material can further comprise an alkali. An alkali can comprise a basic, ionic salt of an alkali metal or alkaline earth metal element, among others. Alkalis are generally known for being bases, which are compounds with pH greater than 7 that dissolve in water. The alkali metals are a series of elements comprising Group 1 of the periodic table: lithium (Li), sodium (Na), potassium (K), rubidium (Rb), caesium (Cs), and francium (Fr). The alkaline earth metals are a series of elements comprising Group 2 of the periodic table: beryllium (Be), magnesium (Mg), calcium (Ca), strontium (Sr), barium (Ba) and radium (Ra). The alkali of various embodiments of the present invention can comprise sodium hydroxide, calcium hydroxide, potassium hydroxide, magnesium hydroxide, and combinations thereof, among others. In an exemplary embodiment of the present invention, the alkali is a sodium hydroxide (NaOH) solution. In an embodiment of the present invention, a pozzolan foam material can comprise about 1 M to about 2.5 M NaOH, or about 1.3 M to about 2.2 M NaOH. One of ordinary skill in the art would realize that the amount of alkali hydroxide required for a particular application depends in part on the amount and composition of the pozzolan employed therewith. Although not wishing to be bound by any particular theory, the alkali is believed to function as a wetting agent.

In an embodiment of the present invention, a pozzolan foam material can further comprise a silicate. In an embodiment of the present invention, the silicate can comprise an alkali metal silicate. In an embodiment of the present invention, the alkali metal silicate can comprise sodium silicate ($Na_2SiO_3$), sodium orthosilicate ($Na_4SiO_4$), sodium metasilicate ($Na_2SiO_3$), sodium polysilicate, ($[Na_2SiO_3]_n$), and sodium pyrosilicate ($Na_6Si_2O_7$), among others. In an exemplery embodiment of the present invention, a silicate is sodium silicate. In an embodiment of the present invention, a pozzolan foam material can comprise about 1% to about 9% sodium silicate.

Though not wishing to be bound by any particular theory, it is believed that the mixture of a plurality of cenospheres and an alkali (e.g., NaOH) results in a formation of glassy or ceramic bond between the cenospheres, which can be enhanced by using a silicate, such as sodium silicate.

In an embodiment of the present invention, a pozzolan foam material can further comprise a hydrophobic compound. A hydrophobic compound can comprise many organic compounds, including but not limited to, lipids, waxes, oils, aliphatic compounds, acyclic compounds, cyclic compounds, aromatic compounds, alkanes, paraffins, alkenes, olefins, alkynes, polymers, esters, ethers, ketones, aldehydes, alcohols, alkyl halides, nitriles, thiols, fatty acids, and combinations thereof. In an exemplary embodiment of the present invention, a hydrophobic compound can comprise cooking oil. A cooking oil can comprise a purified fat of plant or animal origin, which is liquid at room temperature. Cooking oil can comprise vegetable oil, olive oil, palm oil, soybean oil, canola oil, pumpkin seed oil, corn oil, sunflower oil, safflower oil, peanut oil, grape seed oil, sesame oil, argan oil, coconut oil, nut oil, edible oils, rice bran oil, cottonseed oil, and combinations thereof, among others.

In an embodiment of the present invention, a hydrophobic compound can comprise an alkane. In an exemplary embodiment of the present invention, the alkane can comprise a heptane.

In an embodiment of the present invention, a pozzolan foam material can further comprise a phosphorous containing compound, including but not limited to, aluminum phosphate, phosphoric acid, and combinations thereof. Although not wishing to be bound by any particular theory, it is believed that the addition of a phosphorous containing compound decreases the time required to cure a pozzolan foam material and increases the strength of the pozzolan foam material.

In an embodiment of the present invention, a pozzolan foam material can further comprise a variety of additives, including but not limited to, gravel, sand, soil, stone, pigment, calcined soil, Portland cement, limestone, gypsum, concrete, mortar, grout, and combinations thereof. When additives are employed in place of the pozzolan materials, a person of ordinary skill in the art would realize that it may be necessary to further adjust the relative proportions of the other ingredients somewhat, depending upon the makeup of the particular mixture of pozzolan(s) and additive(s) used. Furthermore, it is understood that the mechanical properties of the resultant product can vary when the compositional parameters deviate significantly from those set forth above.

An aspect of the present invention comprises methods of making a pozzolan foam material comprising: admixing a pozzolan, an alkali, a silicate, and an organosilicon compound to form a mixture; and curing the mixture to form a pozzolan foam material. In an embodiment of the present invention, admixing a pozzolan, an alkali, a silicate, and an organosilicon compound to form a mixture can comprise admixing a pozzolan, an alkali, and a silicate to form a substantially uniform paste and admixing an organosilicon compound with the paste thereby initiating the foaming of the paste. In an embodiment of the present invention, admixing a pozzolan, an alkali, a silicate, and an organosilicon compound to form a mixture can comprise admixing a plurality of cenospheres, a sodium hydroxide solution, a sodium silicate solution, and a dimethylsiloxane solution.

In an embodiment of the present invention, curing the mixture to form a pozzolan foam material can comprise heating the mixture to temperatures of about 90° C. to about 130° C. for about 15 hours to about 28 hours. In an exemplary embodiment of the present invention, curing the mixture to form a pozzolan foam material can comprise heating the mixture to temperatures of about 100° C. for about 20 hours. In an embodiment of the present invention, curing the mixture to form a pozzolan foam material can comprise curing the mixture at ambient temperature for several days. In an embodiment of the present invention, curing the mixture to form a pozzolan foam material can comprise curing the mixture at ambient temperature for several hours. Little, if any, heating is required in the formation of a pozzolan foam material. Thus, the energy requirements of the methods and compositions of the present invention are quite low, thereby contributing to the relatively low cost a pozzolan foam material.

In an embodiment of the present invention, methods of making a pozzolan foam material can further comprise preparing a mixture of a pozzolan, an alkali, a silicate, an organosilicon compound, and a phosphorous-containing compound, including but not limited to, aluminum phosphate, phosphoric acid, and combinations thereof. Although not wishing to be bound by any particular theory, it is believed that the addition of a phosphorous containing compound decreases the time required to cure a pozzolan foam material and increase the strength of a pozzolan foam material. For example, the addition of a phosphorous containing compound can reduce curing times from about 20 hours to about 3 hours.

In an embodiment of the present invention, methods of making a pozzolan foam material can further comprise distributing the foaming paste at a point of use prior to curing. Methods of distributing the foaming the paste at the point of use can include, for example, pouring or pumping the fluid into a container or form, spraying the fluid onto a supporting structure, or many other methods of distribution known to those of ordinary skill in the art.

In an embodiment of the present invention, methods of making a pozzolan foam material can comprise forming the mixture of a pozzolan, an alkali, a silicate, and organosilicon compound into a mass. In an embodiment of the present invention, methods of making a pozzolan foam material can comprise forming the mixture of a pozzolan, an alkali, a silicate, and organosilicon compound into a shaped article. The subsequent curing step can be carried out in a manner such that the shaped article will attain a desired strength. The mixture of a pozzolan, an alkali, a silicate, and organosilicon compound can be formed into a shaped article by many methods known in the art, including compacting, molding, casting, extruding, or slip forming, among others. The method of formation will be largely determined by the composition of the mixture and the nature of the finished shaped article. In this regard, it should be noted that a variety of shaped articles can be formed into, including but not limited to, "building elements," which as used herein comprises tiles, pavers walls, bricks, sheets, rods, pipes, tubes, blocks, walls, among others.

In an embodiment of the present invention, methods of making a pozzolan foam material can further comprise, prior to curing the mixture, admixing a variety of additives, including but not limited to, gravel, sand, soil, stone, pigment, calcined soil, Portland cement, limestone, gypsum, concrete, mortar, grout, and combinations thereof to the mixture. A person of ordinary skill in the art would realize that generally such additives will be included in the mixture to produce a pozzolan foam material having desired physical or mechanical properties, such as texture, color, appearance, or strength, among others.

Embodiments of compositions made according to the methods disclosed herein exhibit excellent compressive strength and are able to withstand pressures of in excess of about 3 MPa. More particularly, embodiments of compositions made according to the methods disclosed herein are able to withstand pressures of about 3.7 MPa to about 11.64 MPa or about 530 psi to about 1,700 psi. The specific gravity of embodiments of the compositions of the present invention can range from about 0.3 to about 0.9. The specific gravity of embodiments of the compositions of the present invention can range from about 0.5 to about 0.7. Embodiments of the compositions made according to the methods disclosed herein exhibit excellent fire resistance and have been found to withstand the tip flame of an oxyacetylene torch (approximately 5000° F.) without ignition or melting.

Various embodiments of the compositions of the present invention comprise numerous beneficial chemical, physical, and mechanical properties. In embodiments of the present invention, a pozzolan foam material can be lightweight, strong, homogeneous, isotropic, inexpensive, hydrophobic (e.g., water repellent), environmentally-friendly, machinable, sound absorbing, permeable, thermal insulating, fire resistant, shock absorbing, and energy absorbing. Because of their resistance to heat transfer, fire, weathering, and the like, in addition to their strength and low density, pozzolan foam compositions and methods of making pozzolan foam compositions of the present invention can have applications in various industries, including but not limited to, the automotive, marine, construction, and aerospace industries.

For example, a pozzolan foam material can be used as infrastructure materials that also act as sound, crash, and fire barriers; permeable pavements; hazard mitigation materials; drainage fillers; ultralight truss stiffeners; foam, wood, and concrete replacements; acoustic ceiling tiles; sealants; putties; among others. Given the hardness of many pozzolans, a pozzolan foam material can provide erosion and/or weather resistance. In transportation systems, a pozzolan foam material can be used as cores of shock and crash absorbers, stiff fillers of trailer floors, or B-pillars in sandwich constructions. In space vehicles, a pozzolan foam material can be utilized as resilient lightweight heat shields that easily adapt to aerodynamic forms. In protective installations, a pozzolan foam material can be used to make blast walls, insulating refractories, oil pipe line insulation, or fire resistant coatings and panels. Considering their initial fluid-like states, a pozzolan foam material can be pumped into unreachable empty spaces to act as filler materials to reinforce complex-shaped devices and components or to support eroded embankments or erosion areas, such as under bridges. A pozzolan foam material can be used in lightweight insulation products, including but not limited to, potting compounds, electrical encapsulation, and solenoids. Using the compositions and methods of the present invention, a pozzolan foam material can be tailored for many specific engineering applications by varying the compositions and amounts of the components of the foam. A person having ordinary skill in the art would realize that a pozzolan foam material can be used independently or can be integrated into various parts or structures.

An aspect of the present invention comprises a pozzolan foam material having cementitious properties. The present invention relates to cement compositions of many types in which Portland cement or similar cementitious material react in an aqueous environment to bind together various ingredients, such as sand, stone, crushed rock, etc. As used herein the term "cement composition" refers to many cementitious mixtures including, for example, those generally designated in the art as cement, mortar, grout, and concrete. The present invention is applicable, but not limited to, the following types of cement compositions: ready mixed concrete compositions, prefabricated concrete structural elements prepared by autoclaving or steam curing cement compositions, concrete compositions utilized in large mass structures, such as gravity dams, and concrete compositions employed as highway bases and surfaces. These cement compositions can be employed with additional reinforcing elements conventionally utilized in the art to supplement their structural properties.

Various embodiments of the present invention comprise a pozzolan foam composition comprising pozzolan and cement, in relative proportions such that the cement-pozzolan ratio is within the range of approximately 0% to 100%. For present purposes the "cement-pozzolan ratio" means the ratio of dry cement to dry pozzolan material contained in the cement composition. According to these ranges, a pozzolan foam composition can comprise about 0% cement and about 100% pozzolan, about 100% cement and about 0% pozzolan, and all combinations therebetween.

Embodiments of the present invention are directed to systems, apparatus, and methods for reinforcing a container as disclosed in PCT Patent Application No. PCT/US2008/005871, which is herein incorporated by reference in its entirety. An embodiment of the present invention comprises a structure for reinforcing a container. An embodiment of the present invention comprises a container comprising a medium containing volume and a reinforcing structure within the containing volume, wherein the reinforcing structure enables the non-directional flow of a medium within the containing volume.

The term "medium" is used herein for convenience and refers generically to many solids, liquids, gases, solutions, suspensions, powders, gels, dispersions, or combination thereof.

Referring now to the figures, wherein like reference numerals represent like parts throughout the several views, exemplary embodiments of the present invention will be described in detail. Throughout this description, various components can be identified having specific values or parameters, however, these items are provided as exemplary embodiments. Indeed, the exemplary embodiments do not limit the various aspects and concepts of the present invention as many comparable parameters, sizes, ranges, and/or values can be implemented.

Figure 1:
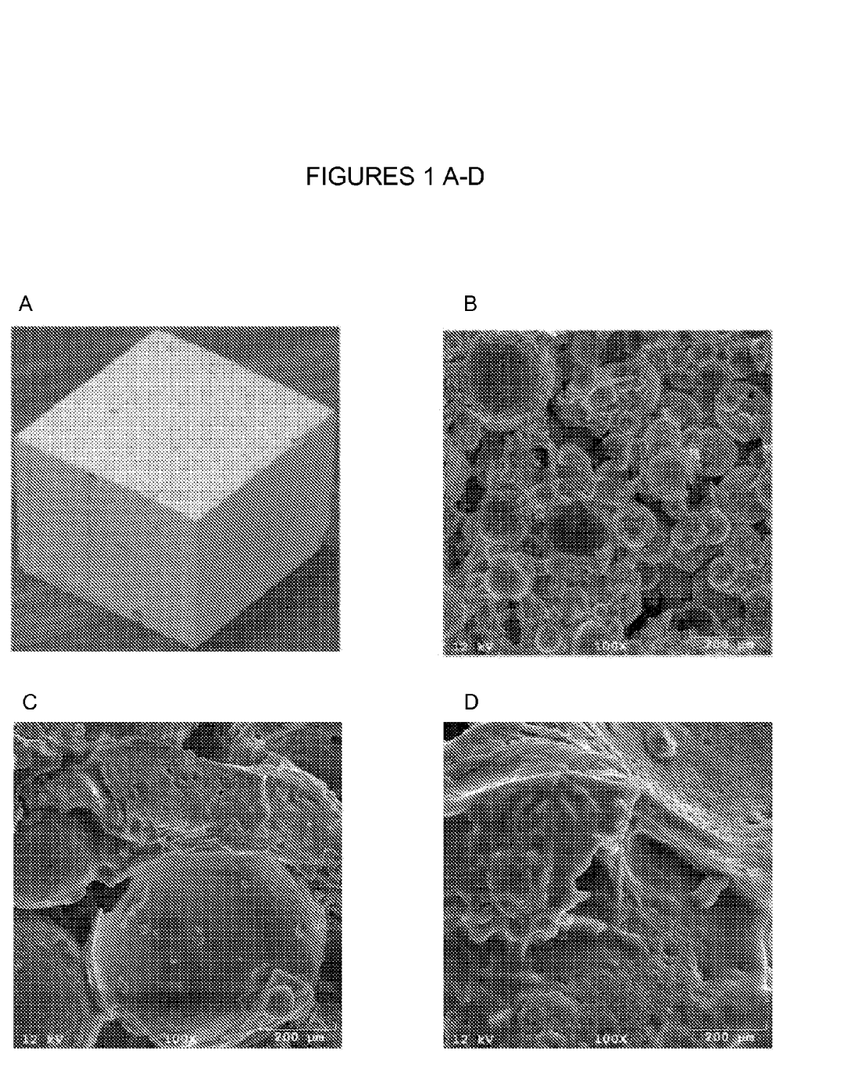

FIG. 1 A illustrates the physical appearance of a pozzolan foam material. FIG. 1 B provides an image of a pozzolan foam material magnified 100×. FIG. 1 C provides an image of a pozzolan foam material magnified 800×, and FIG. 1 D provides an image of a pozzolan foam material magnified 1700×.

Figure 2:
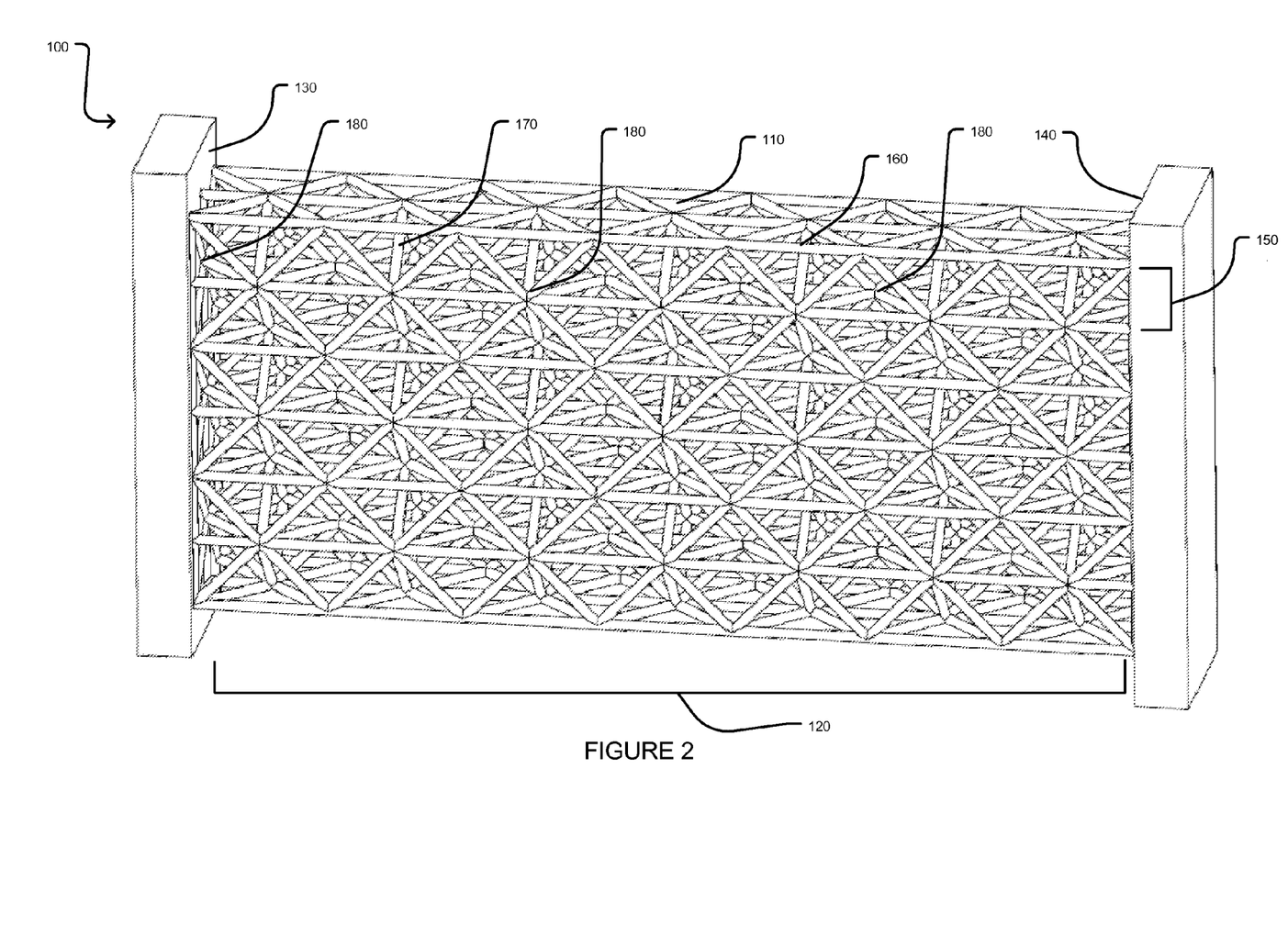
FIG. 2 provides a perspective view of a portion of a container having a reinforcing structure.

FIG. 2 provides a perspective view of a portion of a container having a reinforcing structure 100. More particularly, FIG. 2 illustrates a perspective view of longitudinal section and cross-section of a container having a reinforcing structure 100. An exemplary embodiment of a container having a reinforcing structure can comprise a medium containing volume 110, and a reinforcing structure 120 within the containing volume 110. The medium containing volume 110 can comprise a first surface 130 and a second surface 140. The use of the phrases "first surface" and "second surface" are for convenience in the description of a two-dimensional drawing. In the context of a three dimensional drawing, such a container can have many surfaces that can be described as a first surface or a second surface. In an embodiment of the present invention, a plurality of elements can comprise a plurality of trusses or a plurality of plates. The reinforcing structure 120 of the illustrated embodiment comprises a plurality of trusses 150. In an exemplary embodiment, the reinforcing structure 120 can comprise a skeleton-like structure. The plurality of trusses 150 can comprises a plurality of chords 160. In an embodiment of the present invention, the plurality of chords 160 can comprises chords associated with a first surface 130 and a second surface 140 of the containing volume 110, which traverse the containing volume 110. In an embodiment of the present invention, the chords 160 can be substantially parallel to one another. The plurality of struts 170 can comprise, for example, but not to, a lattice or web of struts, or the like. In an embodiment of the present invention, a strut 170 can be associated with at least one chord 160. In an embodiment of the present invention, a strut 170 can be associated with a first surface 130 or a second surface 140 of the containing volume 110. In an embodiment of the present invention, a plurality of struts 170 can converge on a first surface 130 or a second surface 140 of the containing volume 110 to form a node 180. In an embodiment of the present invention, a plurality of struts can converge on a chord 160 to form a node 180. In an embodiment of the present invention, a plurality of struts 170 can intersect at a point to form a node 180.

In an embodiment of the present invention a reinforcing structure can comprise a pozzolan foam material. In an embodiment of the present invention, the component of a reinforcing structure can comprise a pozzolan foam material. Although not wishing to be bound to any particular theory, it is believed that a medium storage container having a reinforcing structure comprising a pozzolan foam material can achieve higher pressures with lower weights and higher safety ratios as compared to conventional tanks, including but not limited to, fiber reinforced polymer tanks, reinforced and un-reinforced steel and aluminum tanks.

In an embodiment of the present invention, a container having a reinforcing structure can contain many media, including but not limited to, fluids, liquids, solutions, suspensions, gases, gel, dispersions, or combination thereof. In an embodiment of the present invention, an apparatus for containing a medium can contain a medium under high pressure. In an embodiment of the present invention, an apparatus for containing a medium can contain a fluid under high pressure. In an embodiment of the present invention, an apparatus for containing a medium can contain hydrogen, oxygen, nitrogen, carbon dioxide, flammable gases, fluids performing functions that combine thermal and strength effects (e.g., liquid shield insulation, heat shield insulation), among others. In an exemplary embodiment of the present invention, a container having a reinforcing structure can contain liquid hydrogen, compressed hydrogen gas, cryogenic compressed hydrogen gas, hydrogen in a metal hydride, and combinations thereof, among others.

Figure 3A:
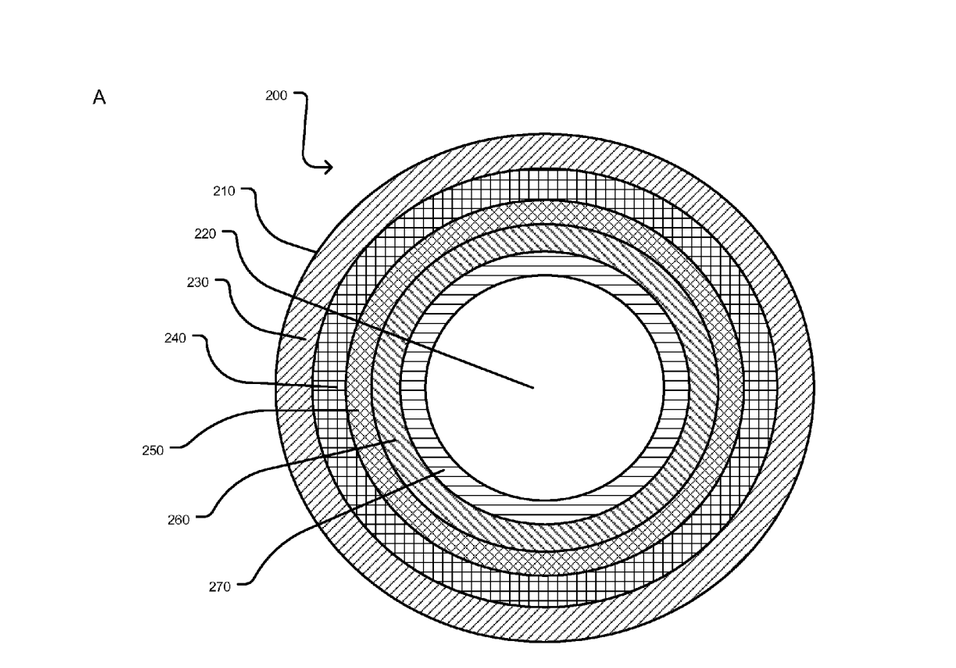
Figure 3B:
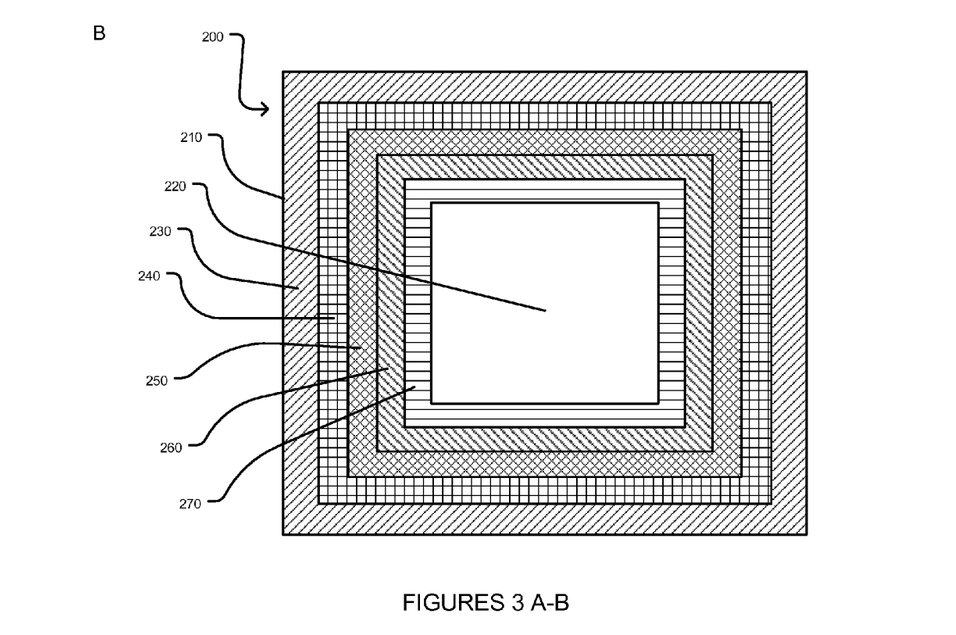

In an embodiment of the present invention, a container 200 for containing a medium can comprise a tank 210 and a plurality of concentric layers of a pozzolan foam material. (See FIG. 3). For example, the innermost void of a container for containing a medium comprising a plurality of concentric layers of a pozzolan foam material can comprise a containing volume 220. A container can comprise a first layer 230 of a pozzolan foam material having a first porosity. Moving inward, a container can further comprise a second layer 240 of a pozzolan foam material having a second porosity. A container can further comprise a third layer 250 of a pozzolan foam material having a third porosity. A container can further comprise a fourth layer 260 of a pozzolan foam material having a fourth porosity. A container can further comprise a fifth layer 270 of a pozzolan foam material having a fifth porosity. A person of ordinary skill in the art would realize that that numerous concentric layers of a pozzolan foam material of varying or identical porosity can comprise a container 200 for containing a medium.

In an embodiment of the present invention, a container 200 for containing a medium can comprise a plurality of concentric layers of a pozzolan foam material having the same or different porosities. In an exemplary embodiment of the present invention, a container 200 for containing a medium can comprise a plurality of concentric layers of a pozzolan foam material, wherein the concentric layers of a pozzolan foam material have decreasing porosities moving outward from the containing volume 210. Although not wishing to be bound by any particular theory, it is believed that a pozzolan foam material can store a medium in its pores. It is believed that a container 200 comprising a plurality of concentric layers of a pozzolan foam material, wherein the concentric layers of a pozzolan foam material have decreasing porosities moving outward from the containing volume 210, reinforces the tank by creating a pressure-gradient that lowers the pressure at the outermost-shell, which allows for safe extraction techniques. A person of ordinary skill in the art would realize that the porosity of the plurality of concentric layers of a pozzolan foam material can affect extraction techniques. Thus, by altering the porosity of a pozzolan foam material, the exit flow rate can be tailored to accommodate the demands of a fuel cell or many storage and/or transportation systems.

In an embodiment of the present invention, the outermost concentric layer of a pozzolan foam material can be surrounded by a solid shell (e.g., a conventional tank wall). In an embodiment of the present invention, the outermost concentric layer of a pozzolan foam material can be surrounded by hollow shells that are filled with a pozzolan foam material.

In an embodiment of the present invention, the plurality of concentric layers of a pozzolan foam material can be separated by a porous divider. The divider can be made of many materials including a wire mesh or a porous or perforated shell covered with a permeable fire-resistant fabric, other fire-resistant materials, or porous materials, among others. In an embodiment of the present invention, the divider can provide a form or mold for the creation of a pozzolan foam material.

In an embodiment of the present invention, the input/output valve can be placed in the plurality of concentric layers of a pozzolan foam material. Although not wishing to be bound by any particular theory, it is believed that placing the input/output valve in the plurality of concentric layers of a pozzolan foam material can reduce the output flow rate in the event of a valve leak. In an embodiment of the present invention, a pozzolan foam material having a low porosity can be mechanically manipulated (e.g., fracturing, drilling, among others) to increase the exit flow rate.

One of skill in the art would realize that the a container 200 for containing a medium can have many shapes, for example, but not limited to, a cylindrical shape (FIG. 3A) rectangular shape (FIG. 3B), a spherical shape, a hemispherical shape, a cube shape, a cuboid shape, a tetrahedron shape, a cone shape, a prism shape, a rectangular prism shape, a pyramid shape, a dodecahedron shape, an oval shape, a "U" shape, a lobed shape, a multi-lobed shape, an arbitrary three dimensional shape, and combinations thereof. One of skilled in the art would realize that the design of a strong, light-weight container utilizing embodiments of the present invention can be customized based upon the desired location and function of the container.

It must be noted that, as used in this specification and the appended claims, the singular forms "a", "an", and "the" include plural referents unless the context clearly dictates otherwise.

All patents, patent applications, and references included herein are specifically incorporated by reference in their entireties.

It should be understood, of course, that the foregoing relates only to exemplary embodiments of the present invention and that numerous modifications or alterations may be made therein without departing from the spirit and the scope of the invention as set forth in this disclosure.

Although the exemplary embodiments of the present invention are provided herein, the present invention is not limited to these embodiments. There are numerous modifications or alterations that may suggest themselves to those skilled in the art.

The present invention is further illustrated by way of the examples contained herein, which are provided for clarity of understanding. The exemplary embodiments should not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

EXAMPLES

Example 1

Analysis of a Pozzolan Foam Material Comprising CG106

In the present example, a pozzolan foam material was created using a plurality of cenospheres grade 106 (CG106) obtained from Trelleborg Fillite, Ltd. Cenospheres grade 106 (CG106) have a diameter of about 5 to about 106 microns. The composition of the pozzolan foam material is provided in Table 1. In each sample (numbers 01-10), 150 ml of cenospheres were mixed with the indicated amount of sodium hydroxide (10M) and the indicated amount of sodium silicate (20-49%) (Univar) until a homogenous paste was formed. An indicated amount of dimethylsiloxane (less than 120 g/L) (Siloxane PD, Sure Klean) was admixed with the paste to foam the paste.

TABLE 1

| Sample | Cenosphere | NaOH | $Na_2SiO_3$ | $SiO(CH_3)_2$ |
|--------|-----------|------|-------------|---------------|
| CG106-01 | 150 ml | 30 ml | 30 ml | 10 ml |
| CG106-02 | 150 ml | 50 ml | 12.5 ml | 12.5 ml |
| CG106-03 | 150 ml | 35 ml | 25 ml | 15 ml |
| CG106-04 | 150 ml | 50 ml | 20 ml | 5 ml |
| CG106-05 | 150 ml | 35 ml | 35 ml | 7.5 ml |
| CG106-06 | 150 ml | 40 ml | 35 ml | 5 ml |
| CG106-07 | 150 ml | 35 ml | 35 ml | 5 ml |
| CG106-08 | 150 ml | 35 ml | 35 ml | 10 ml |
| CG106-09 | 150 ml | 40 ml | 30 ml | 5 ml |
| CG106-10 | 150 ml | 40 ml | 40 ml | 5 ml |

The foamed pozzolan paste was then cured for about 20 h at 100° C. The compressive strength of the pozzolan foam material was determined using custom-designed servo-hydraulic biaxial testing equipment (Instron 8802). As illustrated in Table 2, the pozzolan foam material created using CG106 possessed a specific gravity ranging from 0.5 to 0.7.

Figure 4:
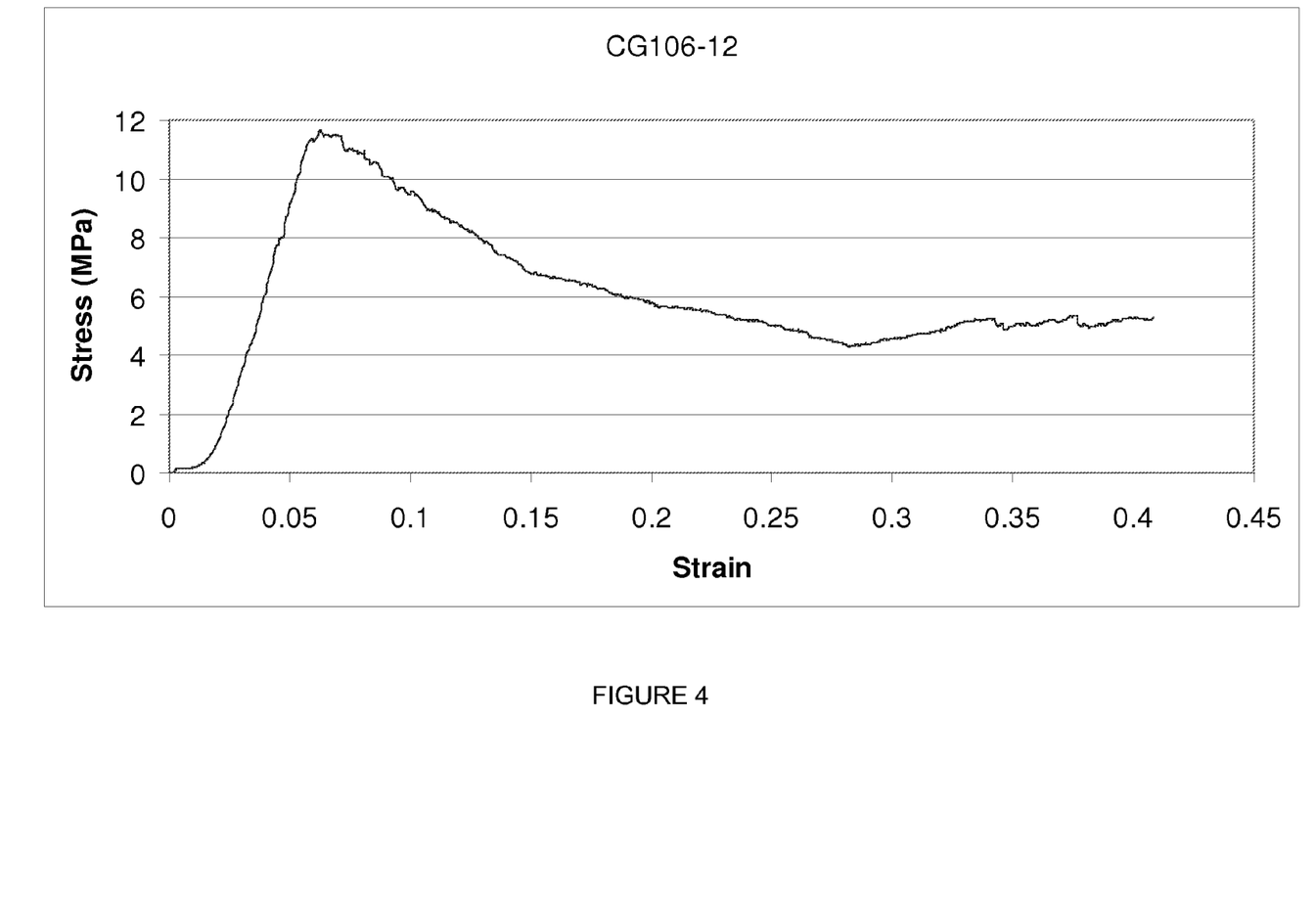
FIG. 4 is a stress-strain curve for an exemplary pozzolan foam material.

The compressive strength of the pozzolan foam material created using CG106 ranged from 3.7 MPa to about 11.7 MPa or 536 psi to 1687 psi. A stress-strain curve for an exemplary pozzolan foam material is provided in FIG. 4.

TABLE 2

| Sample | Specific Gravity | Compressive Strength (MPa) | Compressive Strength (psi) |
|---|---|---|---|
| CG106-01 | 0.55 | 6.63 | 961.35 |
| CG106-02 | 0.50 | 3.7 | 536.50 |
| CG106-03 | 0.51 | 5.3 | 768.50 |
| CG106-04 | 0.54 | 4.95 | 717.75 |
| CG106-05 | 0.70 | 8.1 | 1174.50 |
| CG106-06 | 0.61 | 8.56 | 1241.20 |
| CG106-07 | 0.60 | 7.05 | 1022.25 |
| CG106-08 | 0.70 | 9.63 | 1396.35 |
| CG106-09 | 0.57 | 5.56 | 806.20 |
| CG106-10 | 0.65 | 11.64 | 1687.80 |

Example 2

Analysis of a Pozzolan Foam Material Comprising CG500LF

A pozzolan foam material was created using a plurality of cenospheres grade 500 (CG500LF) obtained from Trelleborg Fillite, Ltd. Cenospheres grade 500LF (CG500LF) have a diameter of about 5 to about 500 microns. The composition of the pozzolan foam material is provided in Table 3. In each sample (numbers 01-10), 150 ml of cenospheres were mixed with the indicated amount of sodium hydroxide (10M) and the indicated amount of sodium silicate (20-49%) (Univar) until a homogenous paste was formed. An indicated amount of dimethylsiloxane (less than 120 g/L) (Siloxane PD, Sure Klean) was admixed with the paste to foam the paste.

TABLE 3

| Sample | Cenospheres | NaOH | Na$_2$SiO$_3$ | SiO(CH$_3$)$_2$ |
|---|---|---|---|---|
| CG500LF-01 | 150 ml | 30 ml | 30 ml | 10 ml |
| CG500LF-02 | 150 ml | 50 ml | 12.5 ml | 12.5 ml |
| CG500LF-03 | 150 ml | 35 ml | 25 ml | 15 ml |
| CG500LF-04 | 150 ml | 50 ml | 20 ml | 5 ml |
| CG500LF-05 | 150 ml | 35 ml | 35 ml | 7.5 ml |
| CG500LF-06 | 150 ml | 40 ml | 35 ml | 5 ml |
| CG500LF-07 | 150 ml | 35 ml | 35 ml | 5 ml |
| CG500LF-08 | 150 ml | 35 ml | 35 ml | 10 ml |
| CG500LF-09 | 150 ml | 40 ml | 30 ml | 5 ml |
| CG500LF-10 | 150 ml | 40 ml | 40 ml | 5 ml |

The foamed pozzolan paste was then cured for about 20 h at 100° C. The compressive strength of the pozzolan foam material was determined using custom-designed servo-hydraulic biaxial testing equipment (Instron 8802). As illustrated in Table 4, the pozzolan foam material created using CG500LF possessed a specific gravity ranging from 0.53 to 0.76. The compressive strength of the pozzolan foam material created using CG500LF ranged from 3.95 MPa to 7.32 MPa or 572 psi to 1061 psi. A series of three asterisks (***) indicate that the value was not determined

TABLE 4

| Grade | Specific Gravity | Compressive Strength (MPa) | Compressive Strength (psi) |
|---|---|---|---|
| CG500LF-01 | *** | *** | *** |
| CG500LF-02 | *** | *** | *** |
| CG500LF-03 | *** | *** | *** |
| CG500LF-04 | *** | *** | *** |
| CG500LF-05 | 0.62 | 7.32 | 1061.40 |
| CG500LF-06 | 0.73 | 6.64 | 962.80 |
| CG500LF-07 | 0.61 | 5.26 | 762.70 |
| CG500LF-08 | 0.56 | 4.72 | 684.40 |
| CG500LF-09 | 0.62 | 5.94 | 861.30 |
| CG500LF-10 | 0.6 | 3.95 | 572.75 |

Example 3

Analysis of a Pozzolan Foam Material Comprising CG500

A pozzolan foam material was created using a plurality of cenospheres grade 500 (CG500) obtained from Trelleborg Fillite, Ltd. Cenospheres grade 500 (CG500) have a diameter of about 5 to about 500 microns. The composition of the pozzolan foam material is provided in Table 5. In each sample (numbers 01-10), 150 ml of cenospheres were mixed with the indicated amount of sodium hydroxide (10M) and the indicated amount of sodium silicate (20-49%) (Univar) until a homogenous paste was formed. An indicated amount of dimethylsiloxane (less than 120 g/L) (Siloxane PD, Sure Klean) was admixed with the paste to foam the paste.

TABLE 5

| Sample | Cenospheres | NaOH | Na$_2$SiO$_3$ | SiO(CH$_3$)$_2$ |
|---|---|---|---|---|
| CG500-01 | 150 ml | 30 ml | 30 ml | 10 ml |
| CG500-02 | 150 ml | 50 ml | 12.5 ml | 12.5 ml |
| CG500-03 | 150 ml | 35 ml | 25 ml | 15 ml |
| CG500-04 | 150 ml | 50 ml | 20 ml | 5 ml |
| CG500-05 | 150 ml | 35 ml | 35 ml | 7.5 ml |
| CG500-06 | 150 ml | 40 ml | 35 ml | 5 ml |
| CG500-07 | 150 ml | 35 ml | 35 ml | 5 ml |
| CG500-08 | 150 ml | 35 ml | 35 ml | 10 ml |
| CG500-09 | 150 ml | 40 ml | 30 ml | 5 ml |
| CG500-10 | 150 ml | 40 ml | 40 ml | 5 ml |

The foamed pozzolan paste was then cured for about 20 h at 100° C. The compressive strength of the pozzolan foam material was determined using custom-designed servo-hydraulic biaxial testing equipment (Instron 8802). As illustrated in Table 6, the pozzolan foam material created using CG500 possessed a specific gravity ranging from 0.3 to 0.8. The compressive modulus ranged from 0.5 GPa to 3 GPa. The compressive strength of the pozzolan foam material created using CG500 ranged from 2.3. MPa to 7 MPa. A series of three asterisks (***) indicate that the value was not determined.

TABLE 6

| Sample | Specific Gravity | Compression Modulus (GPa) | Compression Modulus (ksi) | Compressive Strength (MPa) | Compressive Strength (psi) |
|---|---|---|---|---|---|
| CG500-01 | 0.54 | 0.57 | 82.65 | 2.93 | 807.65 |
| CG500-02 | 0.57 | 0.6 | 87 | 2.35 | 360.33 |

TABLE 6-continued

| Sample | Specific Gravity | Compression Modulus (GPa) | Compression Modulus (ksi) | Compressive Strength (MPa) | Compressive Strength (psi) |
|---|---|---|---|---|---|
| CG500-03 | 0.53 | 0.49 | 71.05 | 2.49 | 571.30 |
| CG500-04 | 0.57 | 0.73 | 105.85 | 3.94 | 424.13 |
| CG500-05 | 0.56 | *** | *** | 3.04 | 440.80 |
| CG500-06 | 0.56 | *** | *** | 2.57 | 372.65 |
| CG500-07 | 0.57 | *** | *** | 5.07 | 735.15 |
| CG500-08 | 0.55 | *** | *** | 3.39 | 491.55 |
| CG500-09 | 0.59 | *** | *** | 3.68 | 533.60 |
| CG500-10 | 0.64 | *** | *** | 6.51 | 943.98 |

As illustrated in Table 7, the pozzolan foam material created using CG500 possessed a plateau strength ranging from 0.81 to 2.08. The tension modulus ranged from about 1 GPa to about 5 GPa or 101.5 ksi to 652.5 ksi, and the tensile strength of the pozzolan foam material created using CG500 ranged from 0.4 MPa to 0.7 MPa or 58 psi to 101.5 psi. A series of three asterisks (***) indicate that the value was not determined Although not indicated in a Table, the thermal conductivity of the pozzolan foam material created using CG500 ranges from 0.14 W/mK to 0.16 W/mK.

TABLE 7

| Sample | Plateau Strength | Tension Modulus (GPa) | Tension Modulus (ksi) | Tensile Strength (MPa) | Tensile Strength (psi) |
|---|---|---|---|---|---|
| CG500-01 | 1.94 | 4.5 | 652.5 | 0.7 | 101.5 |
| CG500-02 | 0.81 | **** | *** | 0.4 | 58 |
| CG500-03 | 0.82 | 2.2 | 319 | 0.7 | 101.5 |
| CG500-04 | 2.08 | 0.7 | 101.5 | 0.7 | 101.5 |
| CG500-05 | *** | *** | *** | *** | *** |
| CG500-06 | *** | *** | *** | *** | *** |
| CG500-07 | *** | *** | *** | *** | *** |
| CG500-08 | *** | *** | *** | *** | *** |
| CG500-09 | *** | *** | *** | *** | *** |
| CG500-10 | *** | *** | *** | *** | *** |

Figure 5A:
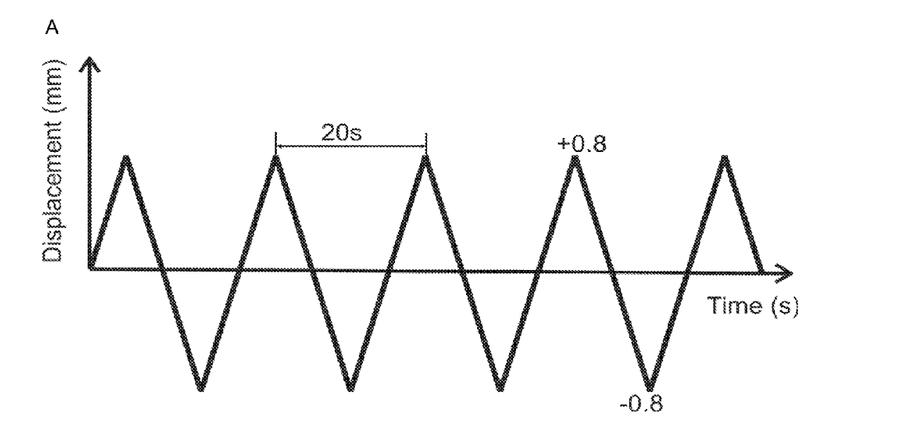
Figure 5B:
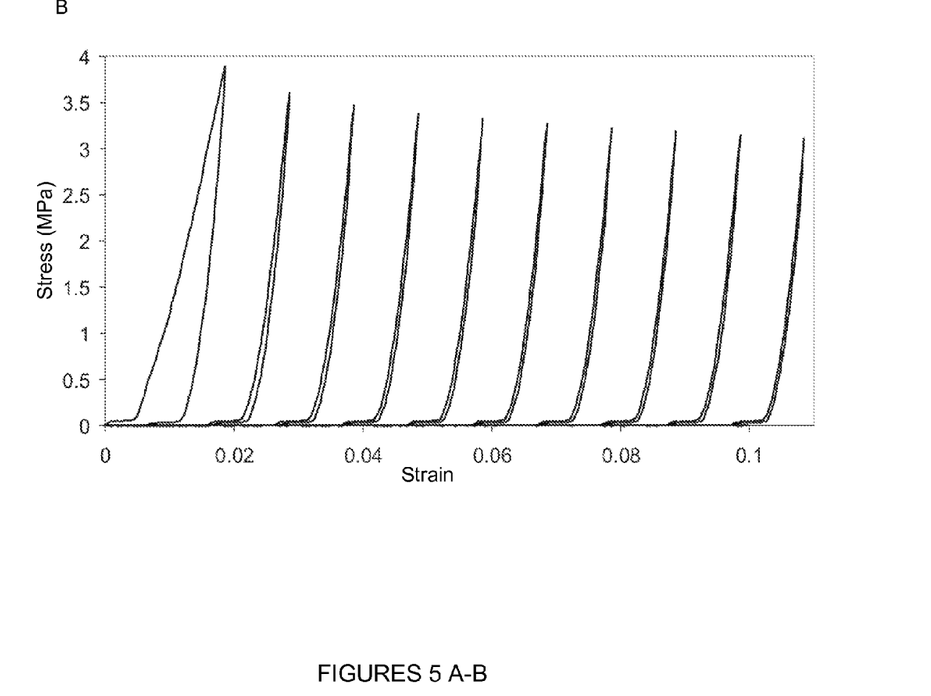
Figure 6A:
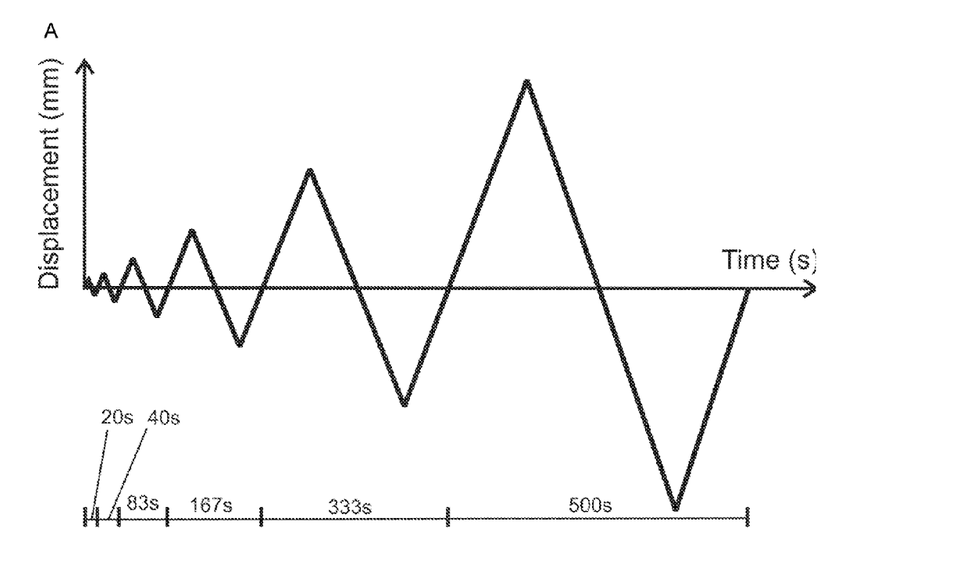
Figure 6B:
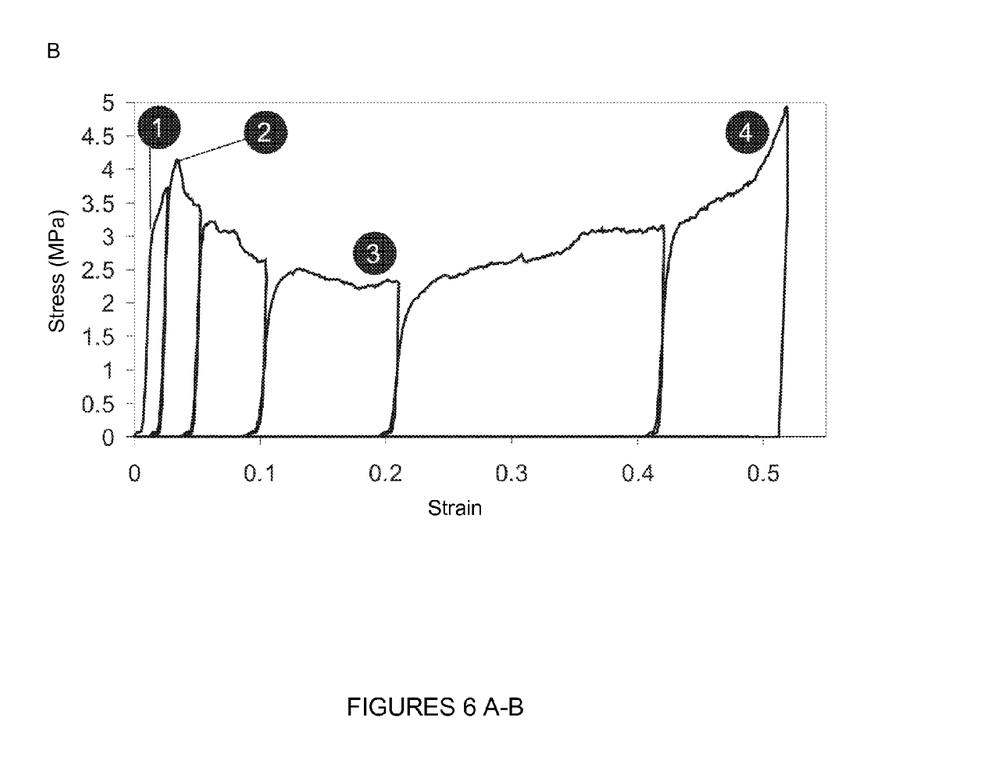
Figure 7:
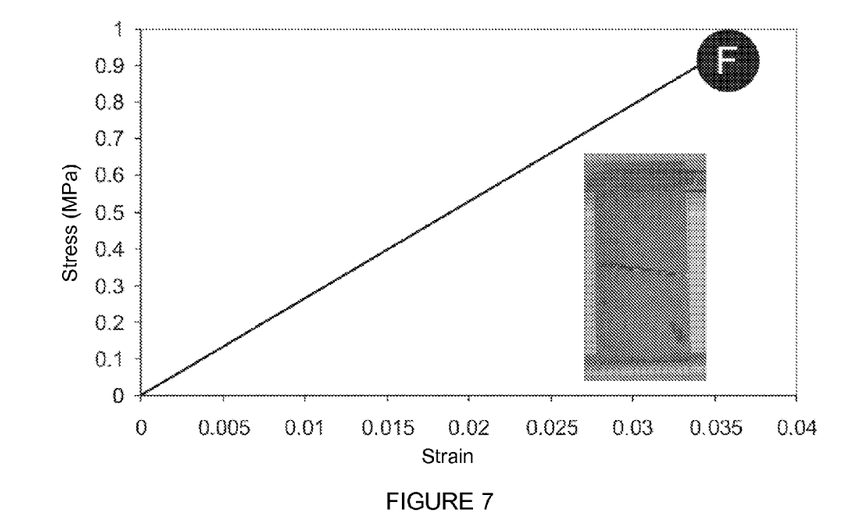
FIG. 7 provides uniaxial tension measurements for a typical response of a pozzolan material comprising cenospheres of grade 500 (CG500).

FIG. 5 A depicts a uniform stiffness test signal at 0.05 Hz, and FIG. 5 B provides stiffness measurements for a typical response of a pozzolan material comprising CG500. FIG. 6 A demonstrates the respective incremental energy absorption signal at 0.05, 0.012, 0.006, 0.003, and 0.002 Hz. FIG. 6 B illustrates the energy absorption measurements for a typical response of a pozzolan material comprising CG500. The area of the graph labeled "1" corresponds to the elastic region, "2" corresponds to the crush nucleation point or compressive strength, "3" corresponds to the plateau strength, and "4" corresponds to densification. FIG. 7 provides uniaxial tension measurements a typical a typical response of a pozzolan material comprising CG500, where "F" indicates the fracture point.

Figure 8:
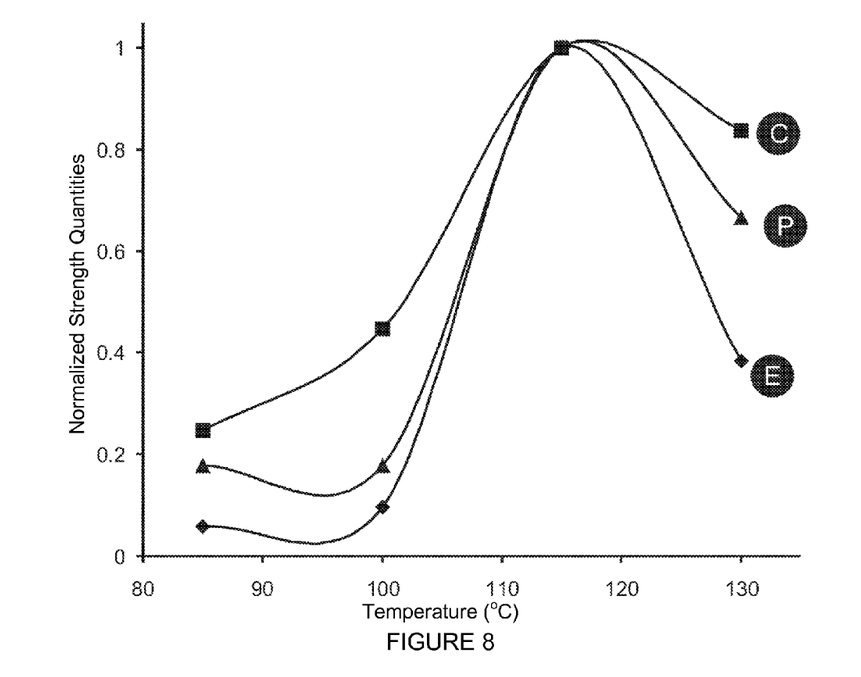
FIG. 8 illustrates the typical effect of curing temperature for a pozzolan foam material comprising cenospheres of grade CG500, using an example of CG500-06.

FIG. 8 illustrates the typical effect of curing temperature for a pozzolan foam material comprising CG500 using an example of CG500-06. In FIG. 8, "C" indicates normalized compressive strength, "P" indicates normalized plateau strength, and "E" indicates normalized compressive modulus. These results were normalized by measured quantities at 115° C.

Figure 9A:
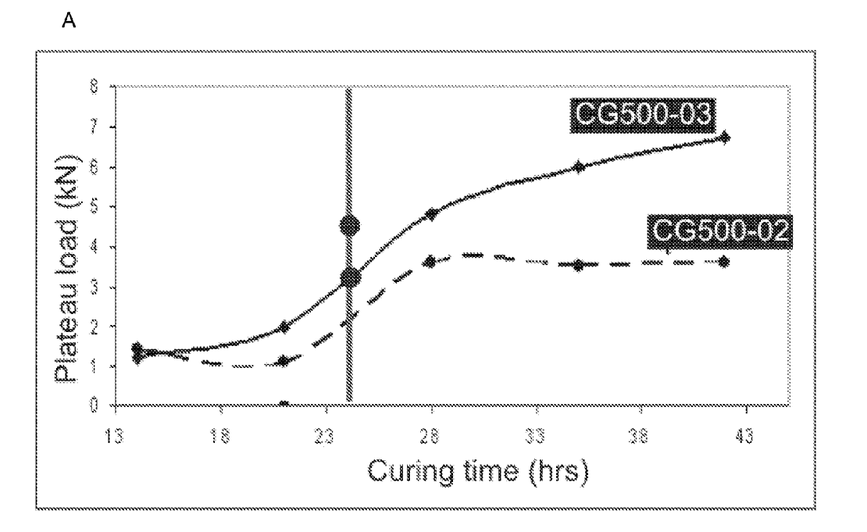
Figure 9B:
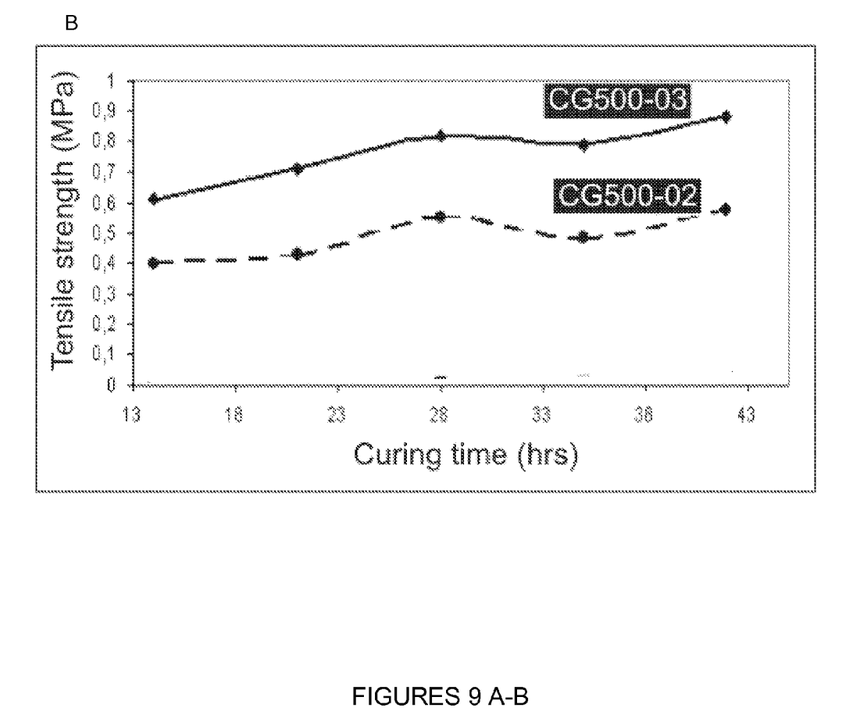

FIG. 9 A shows the typical effect of curing time for a pozzolan foam material comprising CG500 in compression. The vertical line with points shows response at 24 hrs. FIG. 9 B shows the typical effect of curing time for a pozzolan foam material comprising CG500 using examples of CG500-03 and CG500-02 in tension.

Example 4

Analysis of a Pozzolan Foam Material Comprising CG500 and an Oil

A pozzolan foam material was created using a plurality of cenospheres grade 106 (CG106) or grade 500LF (CG500LF) obtained from Trelleborg Fillite, Ltd. The composition of the pozzolan foam material is provided in Table 8. In each sample, 160 ml or 170 ml of cenospheres were mixed with the indicated amount of sodium hydroxide (10M), the indicated amount of sodium silicate (20-49%) (Univar), and the indicated amount of cooking oil until a homogenous paste was formed. An indicated amount of dimethylsiloxane (less than 120 g/L) (Siloxane PD, Sure Klean) was admixed with the paste to foam the paste.

TABLE 8

| Sample | Cenospheres | NaOH | $Na_2SiO_3$ | $SiO(CH_3)_2$ | Oil |
|---|---|---|---|---|---|
| CG106-O-01 | 160 ml | 30 ml | 30 ml | 10 ml | 5 ml |
| CG106-O-05 | 160 ml | 50 ml | 12.5 ml | 12.5 ml | 5 ml |
| CG106-O-06 | 160 ml | 35 ml | 25 ml | 15 ml | 5 ml |
| CG106-O-07 | 160 ml | 50 ml | 20 ml | 5 ml | 5 ml |
| CG106-O-10 | 160 ml | 35 ml | 35 ml | 7.5 ml | 5 ml |
| CG106-O-01* | 170 ml | 40 ml | 35 ml | 5 ml | 10 ml |
| CG106-O-05* | 170 ml | 35 ml | 35 ml | 5 ml | 10 ml |
| CG106-O-06* | 170 ml | 35 ml | 35 ml | 10 ml | 10 ml |
| CG106-O-07* | 170 ml | 40 ml | 30 ml | 5 ml | 10 ml |
| CG106-O-10* | 170 ml | 40 ml | 40 ml | 5 ml | 10 ml |
| CG500LF-O-01 | 160 ml | 30 ml | 30 ml | 10 ml | 5 ml |
| CG500LF-O-05 | 160 ml | 50 ml | 12.5 ml | 12.5 ml | 5 ml |
| CG500LF-O-06 | 160 ml | 35 ml | 25 ml | 15 ml | 5 ml |
| CG500LF-O-07 | 160 ml | 50 ml | 20 ml | 5 ml | 5 ml |
| CG500LF-O-10 | 160 ml | 35 ml | 35 ml | 7.5 ml | 5 ml |

The foamed pozzolan paste was then cured for about 4 h at 100° C. The compressive strength of the pozzolan foam material was determined using custom-designed servo-hydraulic biaxial testing equipment (Instron 8802). It should be noted that the presence of oil in the composition facilitated molding of the foam composition, as the foam can be easily removed from the mold and possessed a smooth, planar surface, which is believed to affect the influence of capillarity flow and foaming effects. As illustrated in Table 9, the pozzolan foam material created using CG106 and oil possessed a specific gravity ranging from 0.52 to 0.6. The compressive strength of the pozzolan foam material created using CG106 and oil ranged from 4.23 MPa to 7.5 MPa or 613 psi to 1087 psi. A series of three asterisks (***) indicate that the value was not determined The pozzolan foam material created using CG500LF and oil possessed a specific gravity ranging from 0.53 to 0.58. The compressive strength of the pozzolan foam material created using CG500LF and oil ranged from 3.5 MPa to 4.26 MPa or 507 psi to 617 psi.

TABLE 9

| Sample | Specific Gravity | Compressive Strength (MPa) | Compressive Strength (psi) |
|---|---|---|---|
| CG106-O-01 | 0.54 | 4.32 | 626.4 |
| CG106-O-05 | 0.54 | 5.92 | 858.4 |
| CG106-O-06 | 0.60 | 7.5 | 1087.5 |
| CG106-O-07 | 0.55 | 4.64 | 672.8 |
| CG106-O-10 | 0.55 | 4.46 | 646.7 |
| CG106-O-01* | 0.52 | 4.23 | 613.35 |
| CG106-O-05* | 0.58 | 7.12 | 1032.4 |
| CG106-O-06* | 0.6 | 5.9 | 855.5 |
| CG106-O-07* | *** | *** | *** |
| CG106-O-10* | 0.58 | 6.8 | 986 |
| CG500LF-O-01 | 0.53 | 4.26 | 617.7 |
| CG500LF-O-05 | 0.57 | 3.92 | 568.4 |
| CG500LF-O-06 | 0.57 | 3.83 | 555.35 |
| CG500LF-O-07 | 0.53 | 3.50 | 507.5 |
| CG500LF-O-10 | 0.58 | 4.05 | 587.25 |

What is claimed is:

1. A pozzolan foam material, comprising:
   a pozzolan in an amount ranging from about 50% to about 95%,
   an organosilicon compound in an amount less than about 8 mg/ml,
   an alkali hydroxide having a concentration ranging from 1M to about 2.5M, and
   a silicate in an amount ranging from about 1% to about 9%.

2. The pozzolan foam material of claim 1, wherein the pozzolan comprises a plurality of cenospheres.

3. The pozzolan foam material of claim 1, wherein the organosilicon compound comprises dimethylsiloxane.

4. The pozzolan foam material of claim 1, wherein the pozzolan foam material comprises a foam-induced porosity of about 0% to about 30%.

5. The pozzolan foam material of claim 1, wherein the alkali hydroxide comprises one or more of sodium hydroxide, calcium hydroxide, pottassium hydroxide, and magnesium hydroxide.

6. The pozzolan foam material of claim 1, wherein the silicate comprises sodium silicate.

7. The pozzolan foam material of claim 1, further comprising a hydrophobic compound selected from the group consisting of lipids, waxes, oils, aliphatic compounds, acyclic compounds, cyclic compounds, aromatic compounds, alkanes, paraffins, alkenes, olefins, alkynes, polymers, esters, ethers, ketones, aldehydes, alcohols, alkyl halides, nitriles, thiols, fatty acids, and combinations thereof.

8. The pozzolan foam material of claim 7, wherein the hydrophobic compound is a cooking oil.

9. The pozzolan foam material of claim 1, further comprising a phosphorous containing compound.

10. A pozzolan foam material, comprising:
    a plurality of cenospheres in an amount ranging from about 50% to about 95%, sodium hydroxide having a concentration ranging from about 1 M to about 2.5 M, sodium silicate in an amount ranging from about 1% to about 9%, and dimethylsiloxane in an amount less than about 8 mg/ml.

11. The pozzolan foam material of claim 10, wherein the plurality of cenospheres have an average longest dimension of less than about 5 micrometers to about 500 micrometers.

12. The pozzolan foam material of claim 10, wherein the pozzolan foam material has a compressive strength of greater than about 3 MPa.

13. A method of making a pozzolan foam material, comprising:
    admixing a pozzolan in an amount ranging from about 50% to about 95%, an alkali hydroxide having a concentration ranging from 1M to about 2.5M, a silicate in an amount ranging from about 1% to about 9%, and an organosilicon compound in an amount ranging from less than about 8 mg/ml to form a mixture; and
    curing the mixture to form a pozzolan foam material.

14. The method of making a pozzolan foam material of claim 13, wherein curing the mixture to form a pozzolan foam material comprises heating the mixture to temperatures of about 90° C. to about 130° C. for about 15 hours to about 28 hours.

15. The method of making a pozzolan foam material of claim 13, wherein curing the mixture to form a pozzolan foam material comprises heating the mixture to temperatures of about 100° C. for about 20 hours.

16. The method of making a pozzolan foam material of claim 13, further comprising prior to step curing the mixture to form a pozzolan foam material, forming the mixture into an article, wherein the step of curing the mixture to form a pozzolan foam material comprises curing the article to form an article comprising a pozzolan foam material.

17. The method of making a pozzolan foam material of claim 13, wherein admixing a pozzolan, an alkali hydroxide, a silicate, and an organosilicon compound to form a mixture further comprises admixing a hydrophobic compound.

18. The method of making a pozzolan foam material of claim 13, wherein admixing a pozzolan, an alkali hydroxide, a silicate, and an organosilicon compound to form a mixture further comprises admixing a phosphorous containing compound.

* * * * *